United States Patent
Schambre et al.

(10) Patent No.: US 6,709,051 B2
(45) Date of Patent: Mar. 23, 2004

(54) BAR ACTUATOR FOR RETRACTABLE HEADREST

(75) Inventors: John E Schambre, Canton, MI (US); Marcus G Washington, Southfield, MI (US); Jack Soullier, Troy, MI (US); Liliana Neag, Walled Lake, MI (US); Louis D DeLellis, South Lyon, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/145,924

(22) Filed: May 15, 2002

(65) Prior Publication Data

US 2003/0214173 A1 Nov. 20, 2003

(51) Int. Cl.[7] ............................................... A47C 1/036
(52) U.S. Cl. ..................... 297/61; 297/378.12; 297/410
(58) Field of Search ..................... 297/410, 61, 378.12

(56) References Cited

U.S. PATENT DOCUMENTS

| | | |
|---|---|---|
| 4,082,354 A | 4/1978 | Renner et al. |
| 4,193,631 A | 3/1980 | Hobley et al. |
| 4,285,545 A | 8/1981 | Protze |
| 4,650,250 A | 3/1987 | Krügener et al. |
| 4,693,515 A | 9/1987 | Russo et al. |
| 4,762,367 A | 8/1988 | Denton |
| 4,978,169 A | 12/1990 | Shannon et al. |
| 5,020,855 A | 6/1991 | Lindberg et al. |
| 5,056,816 A | 10/1991 | Lütze et al. |
| 5,080,437 A | 1/1992 | Pesta et al. |
| 5,346,277 A | 9/1994 | Holobaugh et al. |
| 5,540,479 A | 7/1996 | Thomas et al. |
| 5,681,079 A | 10/1997 | Robinson |
| 5,738,411 A | 4/1998 | Sutton et al. |
| 5,795,023 A | 8/1998 | Kayumi |
| 5,826,942 A | 10/1998 | Sutton et al. |
| 5,895,094 A | 4/1999 | Mori et al. |
| 5,918,940 A | 7/1999 | Wakamatsu et al. |
| 6,050,633 A | 4/2000 | Droual |
| 6,192,565 B1 | 2/2001 | Tame |
| 6,279,996 B1 | 8/2001 | Albrecht |
| 6,290,299 B1 | 9/2001 | Frisch et al. |
| 6,517,156 B1 * | 2/2003 | Lin .......................... 297/61 X |

* cited by examiner

Primary Examiner—Anthony D. Barfield
(74) Attorney, Agent, or Firm—Ralph E. Smith

(57) ABSTRACT

A motor vehicle seat frame assembly for moving a headrest between an extended position and a retracted position as the frame assembly pivots. The frame assembly comprises a seatback frame operatively engaged with the headrest, and a bar having first and second ends. The seatback frame is pivotable from a use position about a first pivot that is fixed with respect to the vehicle. The first end of the bar is pivotably connected to a second pivot that is fixed with respect to the vehicle, and the second end of the bar is attached to the headrest such that the headrest moves from the extended position toward the retracted position as the seatback frame is pivoted from the use position.

16 Claims, 5 Drawing Sheets

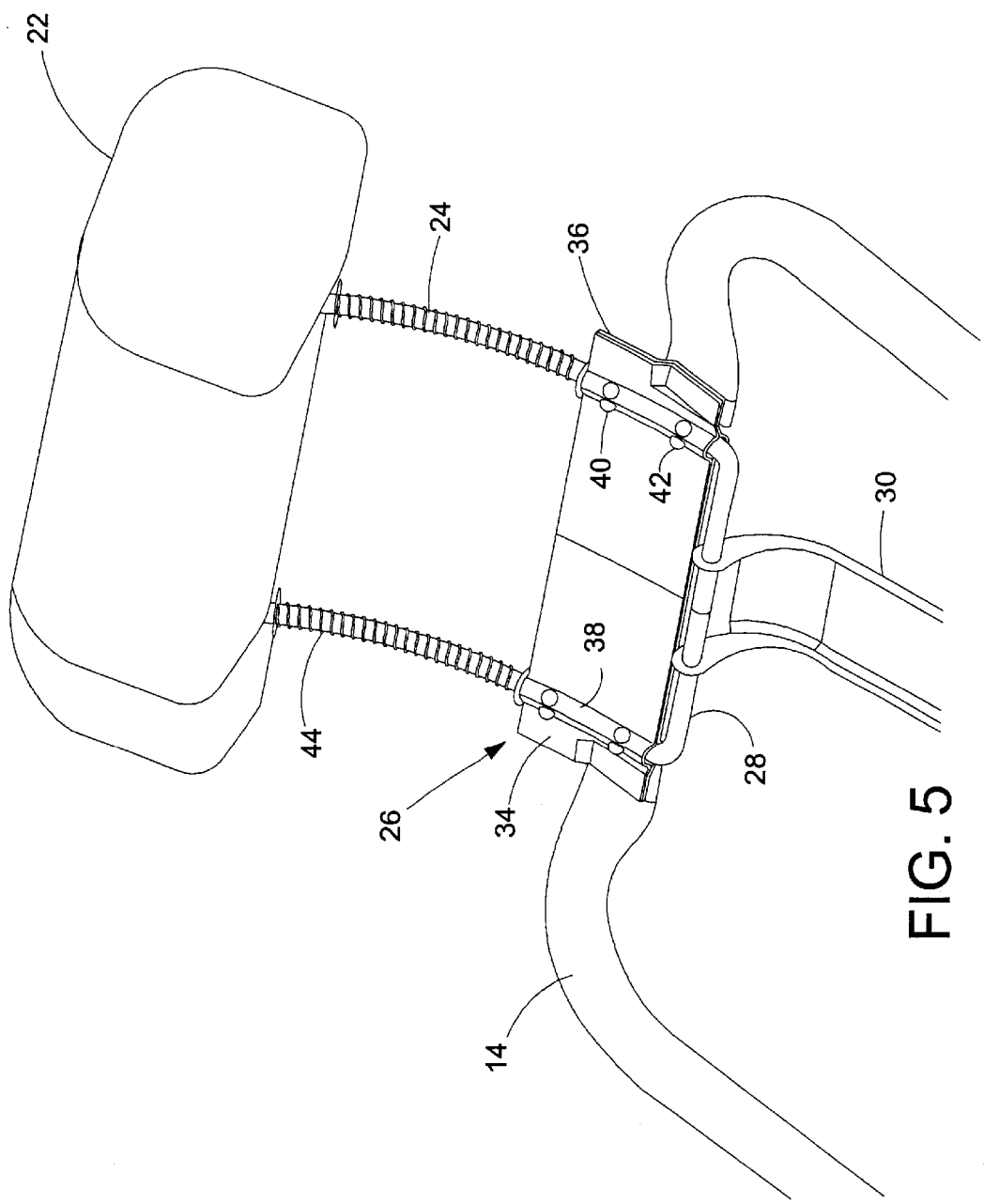

BAR ACTUATOR FOR RETRACTABLE HEADREST

TECHNICAL FIELD OF THE INVENTION

This invention relates generally to seat for motor vehicles, and relates more specifically to a bar actuator for a retractable headrest of a motor vehicle seat.

BACKGROUND OF THE INVENTION

Many motor vehicles, particularly sport utility vehicles and minivans, are equipped with rear seats that can be moved from a seating configuration, in which passengers can sit in the seat, to a so-called "load floor" configuration where the back support of the seat is folded downwardly to assume a horizontal orientation and thereby facilitate cargo stowage in the van. Typically, locking mechanisms are provided for holding the seat in the seating configuration, and the locking mechanisms can be released to permit moving the seat to the load floor configuration.

Various arrangement have been proposed for retracting a headrest of the seat in order to provide the seat with a more compact profile when folded. For example, U.S. Pat. No. 5,826,942 shows a vehicle seat assembly with an adjustable headrest. The headrest is coupled to a lower seatback latch such that upon rotation of the headrest to a stored position, the lower seatback latch is released, enabling the seatback to then be rotated to its stored position.

SUMMARY OF THE INVENTION

The present invention is a motor vehicle seat frame assembly for moving a headrest between an extended position and a retracted position as the frame assembly pivots. The frame assembly comprises a seatback frame operatively engaged with the headrest, and a bar having first and second ends. The seatback frame is pivotable from a use position about a first pivot that is fixed with respect to the vehicle. The first end of the bar is pivotably connected to a second pivot that is fixed with respect to the vehicle, and the second end of the bar is attached to the headrest such that the headrest moves from the extended position toward the retracted position as the seatback frame is pivoted from the use position.

Accordingly, it is an object of the present invention to provide an assembly of the type described above which can be moved to a seating configuration and to a load floor configuration.

Another object of the present invention is to provide an assembly of the type described above that presents a retractable headrest.

Another object of the present invention is to provide an assembly of the type described above that facilitates the storage of relatively compact rear seats of the motor vehicle.

Still another object of the present invention is to provide an assembly of the type described above which is easy to use and cost-effective.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 5 is a perspective view of a headrest for use with the frame.

DETAILED DESCRIPTION OF THE PRESENTLY PREFERRED EMBODIMENTS

Figure 1:
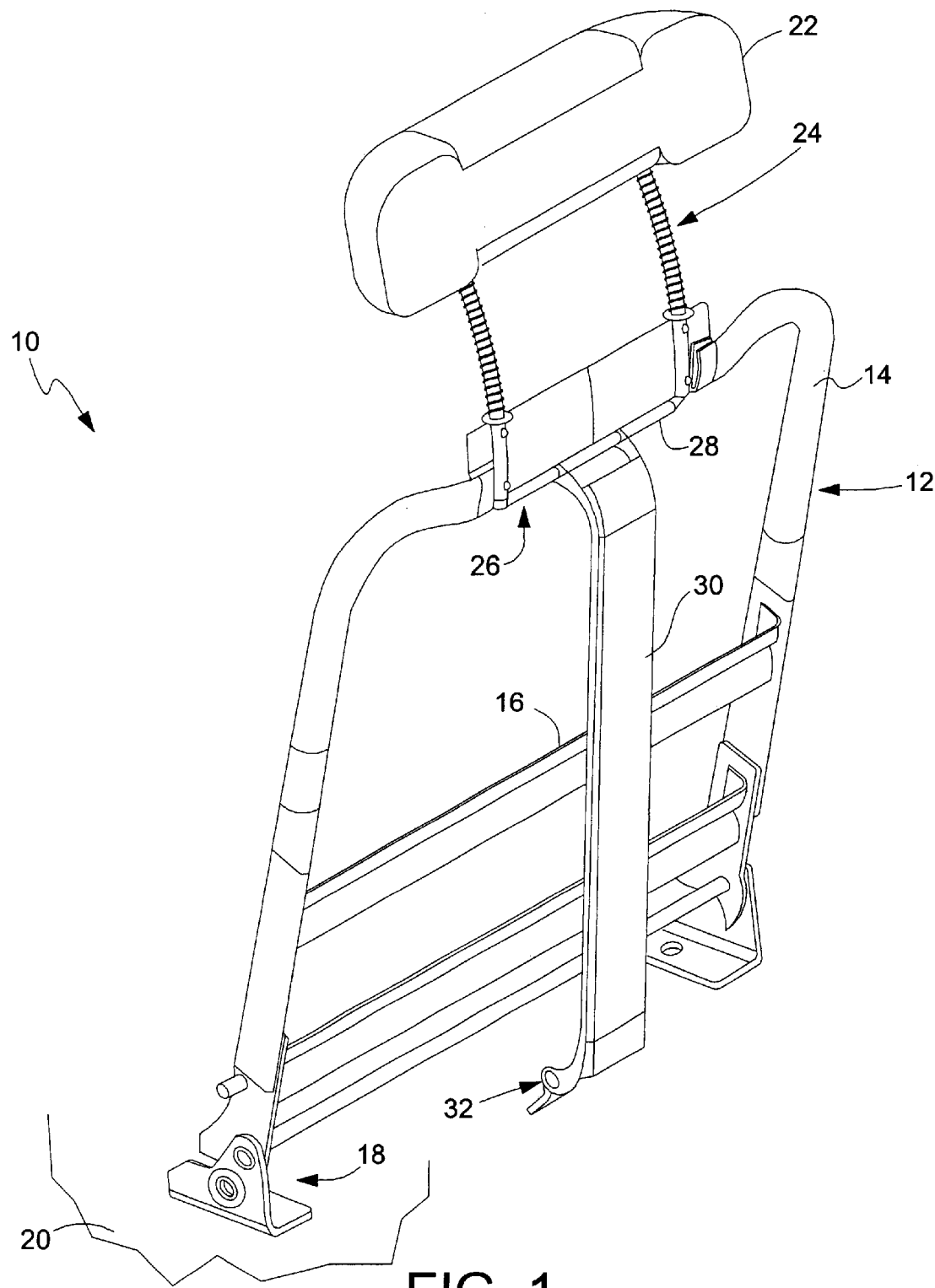
FIG. 1 is a perspective view of a frame according to the present invention for a motor vehicle seat in an upright, use position.

FIGS. 1 through 4 show one embodiment 10 of a frame assembly according to the present invention for a motor vehicle seat. The seat frame assembly 10 includes a seatback frame 12 that may be formed of any conventional material and covered, although not shown, with a conventional foam cushion and seat cover. The seatback frame 12 preferably includes a pair of side members 14, and one or more braces 16 extending between the side members. The lower end of each side member 14 is mounted to a pivot 18, which in turn is secured to an interior load floor 20 of the motor vehicle in any known fashion. Alternatively, the pivot 18 may be attached to the frame of a generally horizontally disposed seat cushion upon which an operator of the vehicle may sit, as is also well known.

Figure 2:
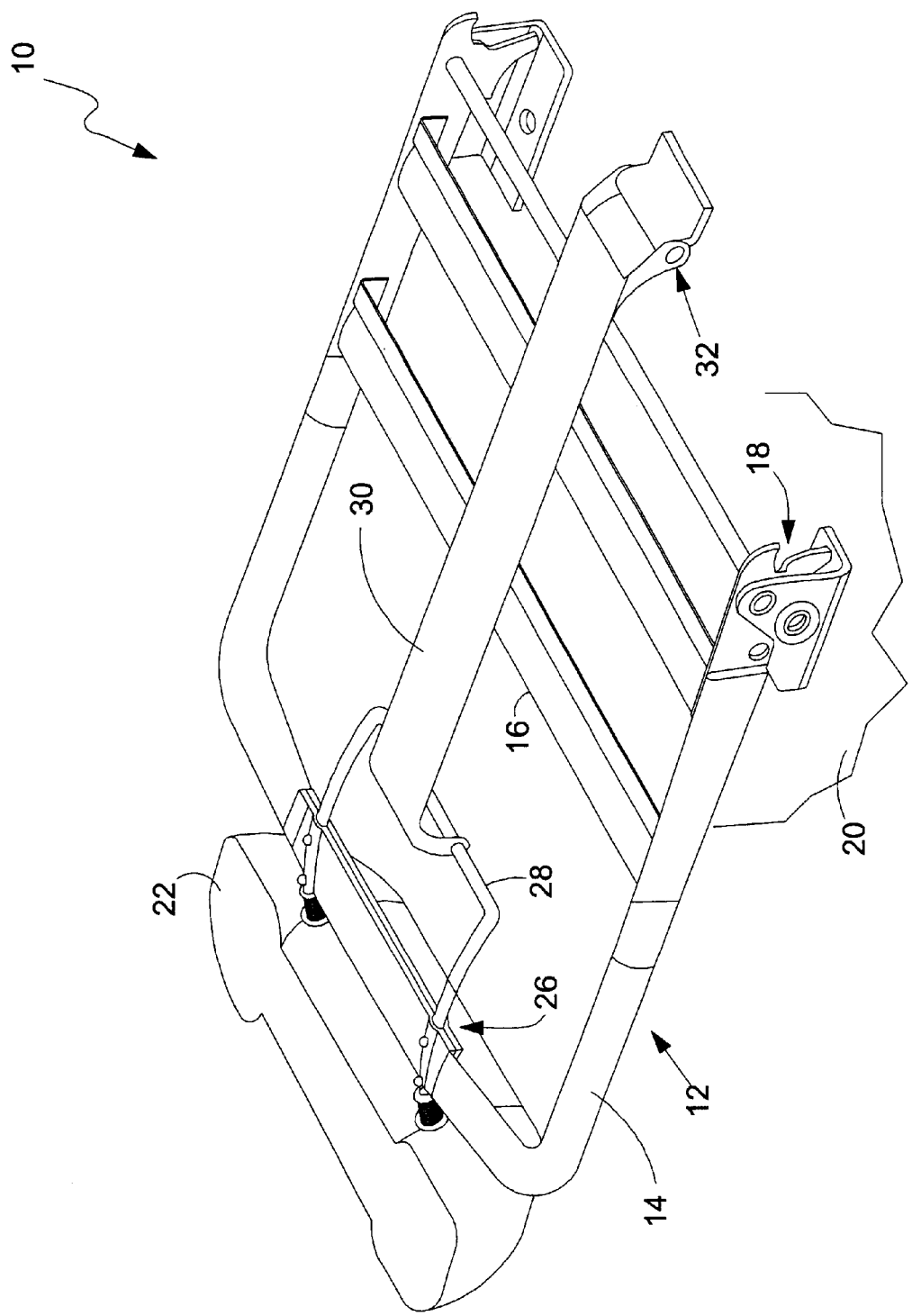
FIG. 2 is a perspective view of the frame in a folded position.
Figure 3:
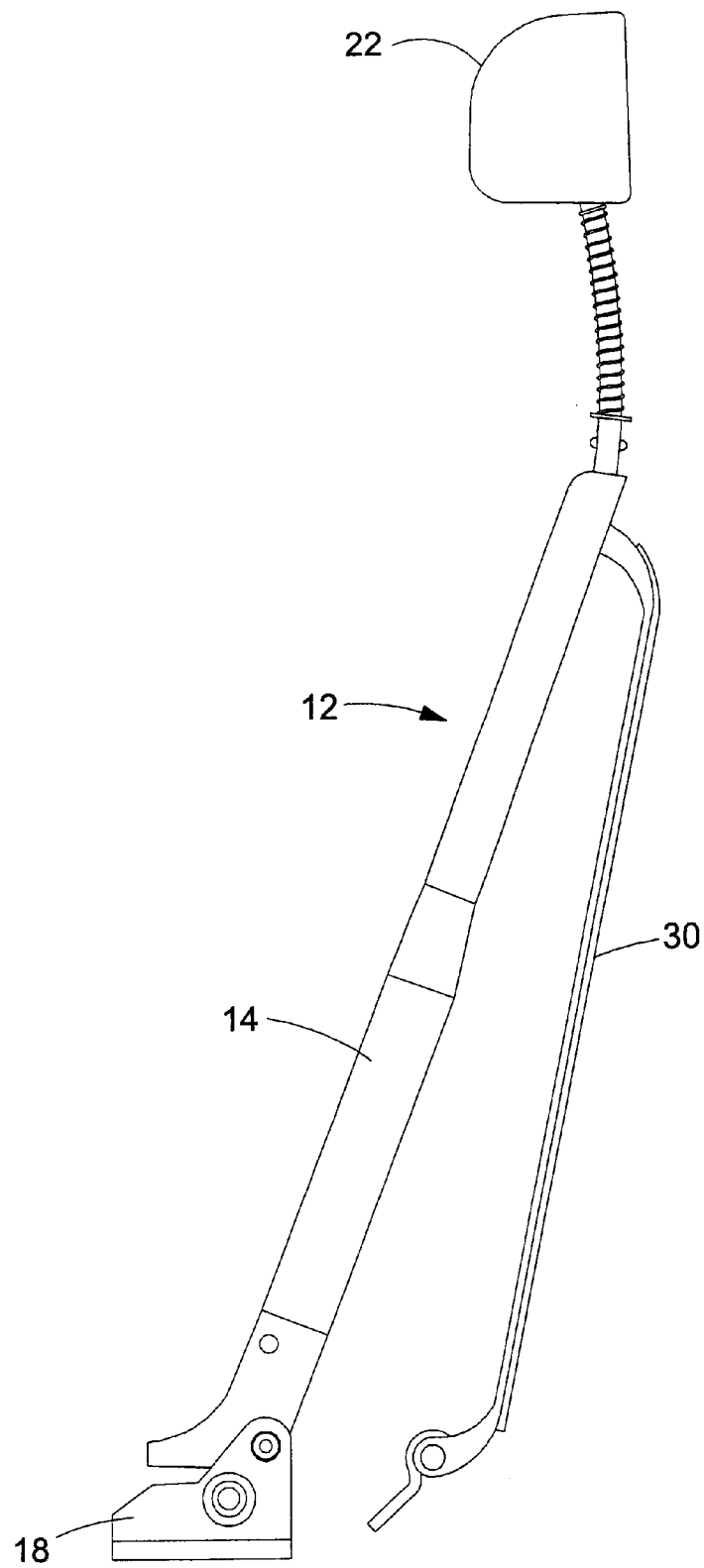
FIG. 3 is a side view of the frame in the upright position.
Figure 4:
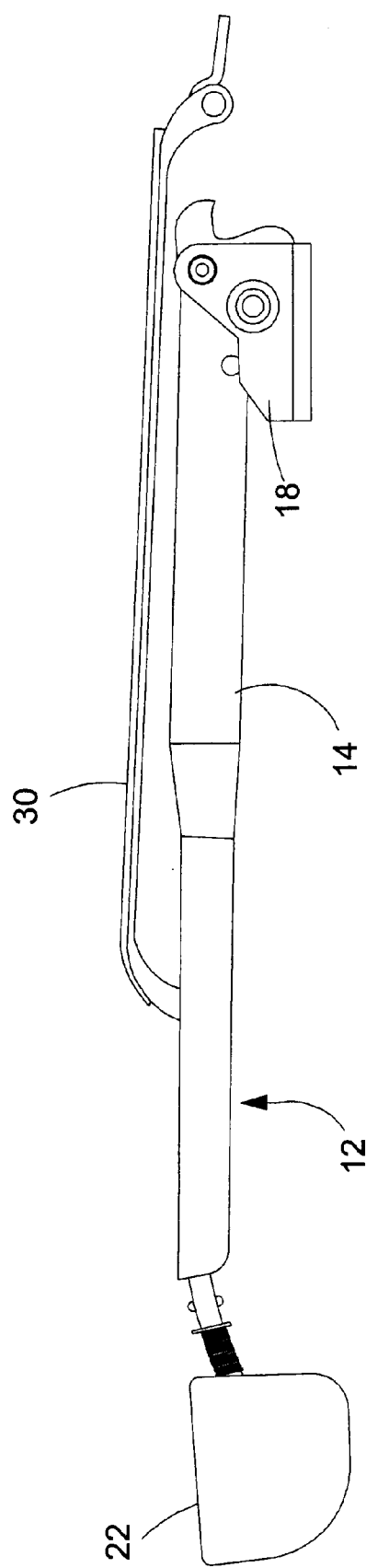
FIG. 4 is a side view of the frame in the folded position.

The seatback frame 12 is pivotable about the pivot 18 between a relatively upright, operational position and a lowered, storage position shown in FIGS. 2 and 4 generally parallel to the load floor. In the upright position, a headrest 22 is spaced above the top of the seatback frame 12 by one or more curved supports 24. The supports 24 engage a guide assembly 26, which is disposed between the side members 14 and forms the upper part of the seatback frame 12. The guide assembly 26 includes a lateral rod 28 that engages a headrest actuator 30. The rod 28 is fixed against rotation relative to the supports 24, and extends through holes in the upper end of the actuator 30 or is otherwise rotatably mounted relative thereto. The rod 28 may be provided with a bearing sleeve to minimize rotational friction between the rod and the actuator 30. Alternatively, the rod 28 may be formed as an integral piece with the actuator 30 welded thereto, or otherwise fixed against rotation relative to the actuator, with the rod rotatable relative to the supports 24.

The actuator 30 is preferably a metal or plastic bar with both compressive and tensile strength, and is connected at its lower end to a fixed pivot 32 spaced some distance rearwardly of the axis defined by the pivots 18. When the seatback frame 12 is rotated from its upright position to its lowered position, the bar actuator 30 retains the rod 28, and thus the supports 24 and the headrest 22, at a constant length from the pivot 32. As a consequence, the supports 24 are drawn through the vertical portions of the guide assembly 26, and the headrest 22 is drawn closer to the top of the seatback 12.

FIG. 5 shows the headrest 22 in greater detail. In a preferred embodiment, the guide assembly 26 includes a front plate 34 and a rear plate 36. Each of the plates 34 and 36 includes a pair of semicylindrical tracks 38 having a radius of curvature matched to the radius of curvature of the supports 24. A plurality of circular openings are formed in the tracks 38 at each of spaced apart upper and lower locations in order to retain ball bearings. In a preferred embodiment, three ball bearings 40 are retained at each of the two upper locations, and three ball bearings 42 are retained at each of the lower locations.

The supports 24 are concave or generally curved toward the front of the headrest 22. Means such as springs 44, acting between the top of the plates 34 and 36 and the bottom of the headrest 22, may be provided to bias the headrest away from the top of the seat frame. The springs 44 also tend to bias the seatback frame 12 toward the upright position. Latching mechanisms, not shown, may also be provided to latch the seatback in either or both of the upright and stowed positions.

When the headrest 22 is drawn downwardly by the bar actuator 30 as the seatback frame 12 is pivoted forwardly, the supports 24 slide through the tracks 38 on the ball bearings 40 and 42. The headrest 22 desirably rests against the top of the cushion overlying the seatback frame 12 when the seatback is pivoted forward to the greatest extent possible in the particular implementation.

The present invention thus provides a headrest that may be raised and lowered, without power, as the seatback is pivoted. With the headrest in the stowed position, the seatback occupies a relatively compact space without the need for undesirable cutouts or scallops in the seat cushion.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A motor vehicle seat frame assembly for moving a headrest between an extended position and a retracted position as the frame assembly pivots, the frame assembly comprising:

a seatback frame operatively engaged with the headrest, the seatback frame being pivotable from a use position to a storage position about a first pivot that is fixed with respect to the vehicle;

a bar having first and second ends, the first end of the bar being pivotably connected to a second pivot that is fixed with respect to the vehicle, and the second end of the bar being attached to the headrest such that the headrest moves from the extended position toward the retracted position as the seatback frame is pivoted from the use position to the storage position; and a headrest guide assembly connected to the seatback frame including a track having a first plurality of openings and a second plurality of openings spaced from the first plurality of openings.

2. The frame assembly of claim 1 wherein the guide assembly further includes a first set of ball bearings disposed in the first plurality of openings.

3. The frame assembly of claim 2 wherein the guide assembly further includes a second set of ball bearings disposed in the second plurality of openings.

4. The frame assembly of claim 3 wherein the first and second sets of ball bearings engage at least one support of the headrest.

5. The frame assembly of claim 1 further comprising a spring bearing against the headrest.

6. The frame assembly of claim 5 wherein the spring biases the headrest away from the seatback frame.

7. A motor vehicle seat frame assembly for moving a headrest between an extended position and a retracted position as the frame assembly pivots, the frame assembly comprising:

a seatback frame operatively engaged with the headrest, the seatback frame being pivotable from a use position about a first pivot that is fixed with respect to the vehicle;

a headrest guide assembly connected to the seatback frame; and a bar having first and second ends, the first end of the bar being pivotably connected to a second pivot that is fixed with respect to the vehicle and spaced apart from the first pivot, and the second end of the bar being attached to the headrest guide assembly such that the headrest moves from the extended position toward the retracted position as the seatback frame is pivoted from the use position, wherein the guide assembly includes a track having a first plurality of openings and a second plurality of openings spaced from the first plurality of openings.

8. The frame assembly of claim 7 wherein the guide assembly further includes a first set of ball bearings disposed in the first plurality of openings.

9. The frame assembly of claim 8 wherein the guide assembly further includes a second set of ball bearings disposed in the second plurality of openings.

10. The frame assembly of claim 9 wherein the first and second sets of ball bearings engage at least one support of the headrest.

11. The frame assembly of claim 7 further comprising a spring bearing against the headrest.

12. The frame assembly of claim 11 wherein the spring biases the headrest away from the seatback frame.

13. A seat for a motor vehicle, the seat comprising:

a headrest;

a seatback frame operatively engaged with the headrest, the seatback frame being pivotable from a use position about a first pivot that is fixed with respect to the vehicle;

a headrest guide assembly connected to the seatback frame; and a bar having first and second ends, the first end of the bar being pivotably connected to a second pivot that is fixed with respect to the vehicle and spaced apart from the first pivot, and the second end of the bar being attached to the headrest guide assembly such that the headrest moves from the extended position toward the retracted position as the seatback frame is pivoted from the use position, wherein the guide assembly includes a track having a first plurality of openings and a second plurality of openings spaced from the first plurality of openings.

14. The frame assembly of claim 13 wherein the guide assembly further includes a first set of ball bearings disposed in the first plurality of openings, and a second set of ball bearings disposed in the second plurality of openings.

15. The frame assembly of claim 14 wherein the first and second sets of ball bearings engage at least one support of the headrest.

16. The frame assembly of claim 13 further comprising a spring bearing against the headrest and biasing the headrest away from the seatback frame.

* * * * *